April 18, 1961    A. WALLER ET AL    2,980,155
HARDWARE FOR MIRRORS
Filed June 22, 1956
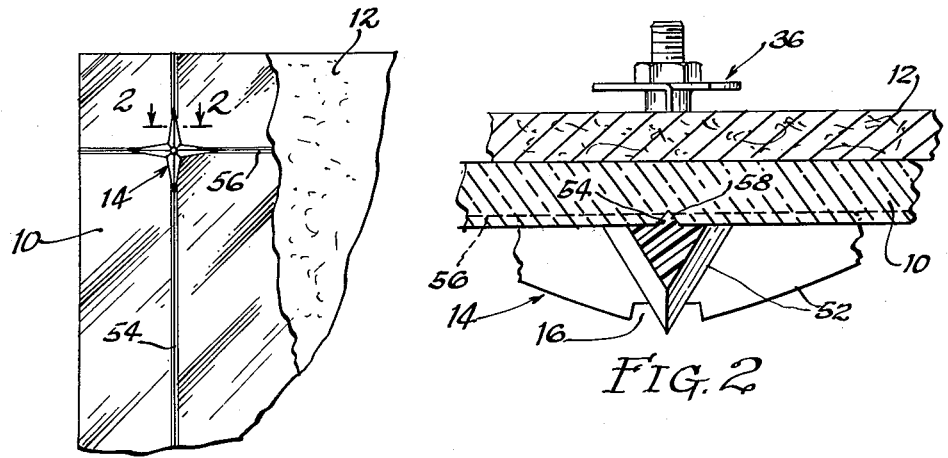
FIG. 1
FIG. 2
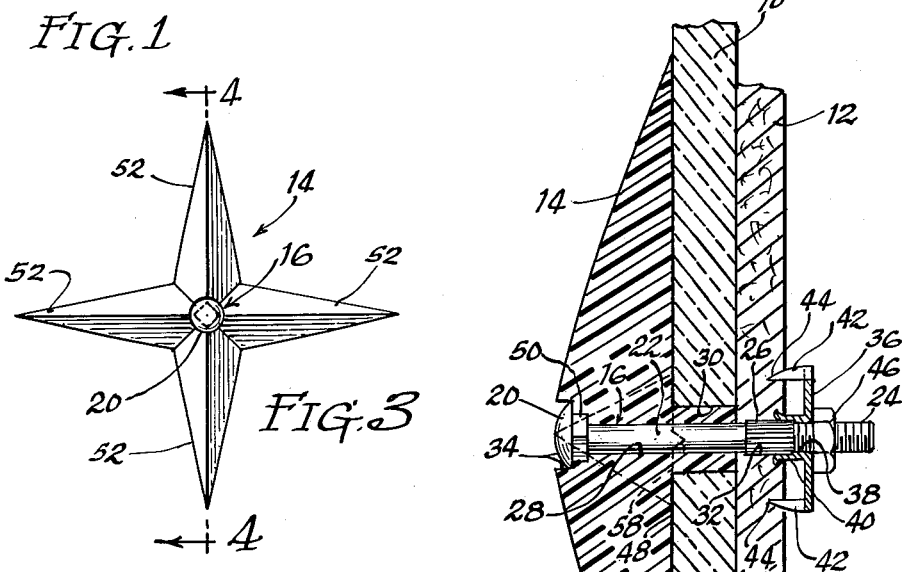
FIG. 3
FIG. 4
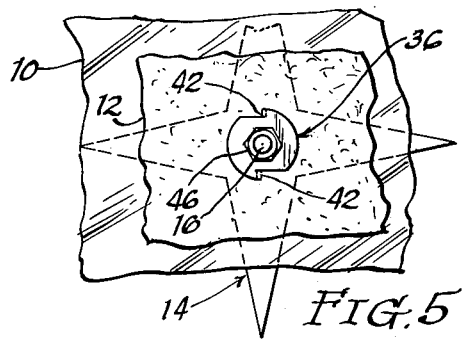
FIG. 5
INVENTORS
Arthur Waller
BY Otto Isensee, Jr.
Ooms, McDougall,
Williams & Hersh
Attorneys

# United States Patent Office 2,980,155
Patented Apr. 18, 1961

2,980,155

HARDWARE FOR MIRRORS

Arthur Waller, Highland Park, and Otto Isensee, Jr., Glenview, Ill., assignors to Bull Dog Lock Company, Chicago, Ill., a corporation of Illinois Filed June 22, 1956, Ser. No. 593,171

2 Claims. (Cl. 151—68)

This invention relates to the assembly of a mirror or the like glass plate onto a suitable backing, such as a relatively rigid wooden panel and the like, and it relates more particularly to hardware for use in framing a mirror for support on a suitable backing.

It is an object of this invention to produce new and improved hardware for use in maintaining a mirror and the like glass plate on a suitable backing, and it is a related object to make use of the hardware in combination with a mirror for holding the mirror firmly and attractively on the backing member.

Another object is to produce hardware for use in mounting a mirror or the like glass plate onto a suitable supporting panel wherein the hardware embodies means for interlocking the elements in a manner to militate against relative movements and for interlocking the hardware with the supporting panel to obviate displacement of the elements from their assembled relation, thereby to enable the use of hardware capable of being arranged in predetermined positions in use for imparting an attractive and symmetrical appearance which will be maintained over extended periods of time.

These and other objects and advantages of this invention will hereinafter appear and for purposes of illustration, but not of limitation, an embodiment of the invention is shown in the accompanying drawing, in which—

Figure 1 is a fragmentary top plan view of an assembly embodying the features of this invention;

Figure 2 is a sectional view taken along the line 2—2 of Figure 1;

Figure 3 is a top plan view of the plastic member employed in the practice of this invention and illustrated in a preferred position of use;

Figure 4 is a sectional view taken along the line 4—4 of Figure 3; and

Figure 5 is a fragmentary view from the bottom side of the assembly shown in Figures 3 and 4.

Description herein will be made to the assembly for hanging a mirror in position of use on a wall or the like. It will be understood that the term "mirror" is intended also to include other glass panels or plates which are adapted to be hung on a wall or framed, as in the protection of a picture, painting, or the like.

It is the usual practice to provide a backing for the mirror in the form of a panel formed of wood, compressed wood, molded plastics, fiberboard or the like to support the mirror in position of use and for hanging the mirror on a wall. For such purpose, openings are usually drilled in the glass plate for registration with openings provided in the supporting panel and the two are then interconnected by hardware, such as by bolt and nut means. Instead of relying on the head of the bolt to embrace the front face of the mirror, the bolt very often is adapted to pass through a plastic part of an attractice design which operates as the abutment for embracing the front face of the glass plate and for providing an attractive setting in position of use.

It has been found that the components of hardware of the type heretofore employed are capable of inadvertent relative movement from their assembled relation. This is undesirable when inadvertently accomplished because it enables the desired balance between the elements in the assembly to be destroyed and thereby detracts from the appearance of the mirror. Furthermore, inadvertent relative movements between the parts, sufficient to loosen the attaching means, enables separation of the parts with the possible loss of the mirror or damage thereto.

The invention herein is addressed to the production of an assembly wherein the elements resist inadvertent relative movements from the assembled relation, thereby substantially to retain their positions and thereby to remain set in the positions in which they are arranged so that an attractive setting will be retained. Thus it becomes possible, by the practice of this invention, to make use of elements designed to be located on the face of the mirror in a predetermined position for enhancing the attractiveness of the assembly with some assurance that the elements will remain rather permanently in their preset arrangement.

Referring now to the drawing, the numeral 10 represents the mirror and the numeral 12 represents the panel on which the mirror is supported. The panel may be formed of wood, fiberboard, molded plastic or laminate, cardboard or the like, and it is preferred to form the panel of materials which have some degree of flexibility and which have good nail-holding power but which are strong and sufficently rigid to back up and provide a support for the glass mirror. The numeral 14 refers broadly to a molded plastic part forming an element of the fastening means and which is arranged adjacent the front face of the mirror 10.

One of the important concepts of this invention resides in the means for holding the plastic member 14, the mirror 10, and the backup panel 12 together in the assembled relation in a manner which militates against relative movements. For this purpose, use is made of an elongate bolt 16 having a head portion 20, an elongate shank 22, a threaded end portion 24, and an intermediate portion 26 which is either knurled, or ribbed, or formed with other surface roughness and which is dimensioned to be slightly greater in one or more crosswise dimensions than the remainder of the shank 22 above or below the knurled section 26.

The backup panel 12, the mirror 10, and the plastic member 14 are provided with aligned openings 28, 30, and 32 respectively, dimensioned to enable the shank of the bolt to extend continuously therethrough in fitting relation for assembly with the intermediate section 26 of the bolt arranged to be located in the portion of the opening 32 through the backup panel 12. The bolt 16 is dimensioned to have a length greater than the length of the aligned openings at least by an amount which locates a portion of the threaded end beyond the underside of the backup panel 12 when the bolt is inserted endwise through the aligned openings of the backup panel, mirror, and plastic member in their assembled relation. In order to improve the attractiveness of the assembly, the top side of the plastic member 14 is formed with a recess 34 about the openings 28 to enable the head 20 of the bolt 16 to be received fully therein.

Received on the through-extending threaded end portion 24 of the shank is a disc member 36 having an opening 38 in the central portion dimensioned to correspond in cross-section to the diameter of the shank for enabling the disc member to be displaced axially along the shank. The opening 38 is preferably formed by striking the material of the disc member inwardly to extend substantially perpendicularly from the body portion of the disc member to form a cylindrical section 40 having a bore corresponding to the diameter of the shank but less than that of the intermediate section 26, and which is preferably dimensioned also to be greater in its outer wall-to-wall dimension than the diameter of the opening 32 through the backup panel.

Extending downwardly substantially perpendicularly from portions of the disc member and offset outwardly from the opening 38, are one or more rigid piercing members 42 in the form of end sections struck downwardly from peripheral portions of the disc member to provide prongs and in which the downwardly struck prongs are formed with relatively sharply pointed ends 44.

Instead of making use of a sleeve 40 struck integrally from the disc member 36, use can be made of sleeves separately formed to the desired dimension and secured to the disc member by conventional metal fastening means. When such separate means are employed, surface roughness or other gripping means may be formed to extend inwardly and outwardly from the sleeve section for establishing a better gripping relation with the intermediate section 26 and the surrounding portion of the backup panel 12 when inserted into position of use, as will hereinafter be described. Similarly, instead of striking portions of the disc member for use as the piercing prongs, other elements such as pins, nails, prongs and the like may be provided in portions of the disc member in spaced relation with the sleeve and extending substantially in parallel relation therewith.

In use, the plastic part 14, the mirror 10, and the backup panel 12 are arranged with the openings 28, 30, and 32 in alignment. The shank of the bolt is inserted endwise through the aligned openings from the front until the threaded end portion 24 extends outwardly beyond the rear wall of the backup panel. The disc member 36 is then placed onto the threaded end portion 24 of the shank with the sleeve 40 and the prongs 42 extending forwardly in the direction of the backup panel. A nut 46 is then threaded onto the end portion of the shank.

As the nut 46 is tightened down onto the threaded end portion of the shank, the disc member 36 is forced inwardly axially on the shank until the prongs 42 pierce the back side of the backup panel 12 to become embedded therein while the sleeve 40 is displaced onto the intermediate section 26 and into the area between the intermediate section and the surrounding portion of the backup panel, thereby to effect a strong gripping relationship with the intermediate section of the bolt and concurrently to establish a strong gripping relationship with the surrounding portion of the backup panel. The gripping relationship is enhanced by the fact that the sleeve portion coming into engagement with the intermediate section tends to be deformed outwardly in a manner to effect a more substantial engagement with the surrounding portion of the backup panel while the backup panel tends to resist such deformation to provide an interlocking relationship therebetween. This interconnection is further assisted by the formation of surface roughness or to provide prongs extending outwardly from the outer wall of the sleeve member.

In a device of the type described, it is preferred to form the opening through the mirror 10 larger than the diameter of the bolt extending therethrough so as to avoid metal-to-glass contact. For this purpose, the plastic member 14 is provided with a bushing 48 which extends downwardly from the rear face of the plastic part and which is dimensioned to be received in fitting relation in the opening 30 of the mirror to center the plastic part on the mirror. The use of a bushing of this character not only functions to assist in centering the fastening means on the mirror and to avoid metal-to-glass contact, but it also accepts the strains of the attaching means, thereby to relieve the mirror of condition which might cause chipping, cracking, or breakage. In the illustrated modification, the bushing 48 is molded integrally with the plastic part. However, it can be supplied as an element separate and apart therefrom. When separately provided, it can be formed of materials other than plastics, such for example as of wood, felt, or the like.

While the conditions existing between the elements in the assembled relation will provide substantial resistance to relative turning movement between the disc 36, the bolt 16, and the backup panel 12, it is possible with the application of forces sufficient to overcome frictional resistance, to cause the plastic part 14 to turn relative to the other elements of the attaching means. When the plastic member is formed of a highly decorative design which finds merit in maintaining a predetermined position in use, it becomes desirable also to embody means for holding the plastic member in a manner which prevents its turning movement from the assembled relation.

Thus a further concept of this invention resides in a means for maintaining directional stability between the plastic part 14 and the fastening means described for holding the plastic part on the mirror. One such means, illustrated in the drawing, includes a portion 50 depending from the underside of the head 20 to form an integral part thereof wherein the depending portion is formed to a contour in transverse cross-section which is other than round, such for example as the square section 50 shown in the drawing. The recess 34 in which the head is received in the plastic part is formed with a bottom section shaped in cross-section to correspond with the portion 50 of the head to receive the square section in fitting relation therein, thereby to prevent relative movements. The means described in combination with the previously described attaching elements operates effectively to militate against inadvertent misalignment of the plastic parts on the face of the mirror.

This is of particular importance where the plastic part is formed of a new and novel design having a star shape, as shown in the drawings, wherein a central portion of greater thickness has elongate arms 52 radiating outwardly therefrom and in which the start is formed with a gradual taper from the center outwardly to the end of the arms.

A very attractive and unique construction is provided when the mirror is formed with crosswise and vertical lines 54 and 56 respectively, cut into the surface as border frame members or as decorative elements and in which the plastic part 14 represents a four-sided star. In such instance, it is desirable to locate the plastic star onto the face of the panel with the points of the star aligned almost perfectly with the crosswise and lengthwise cuts 54 and 56 respectively, as illustrated in the drawing.

A further concept of this invention resides in the construction of the plastic part with ribs 58 extending downwardly from the bottom side of the plastic part with the ribs extending through the center of the plastic part in the crosswise and lengthwise directions and dimensioned to be received in fitting the relation within the slow cuts or break in mirror of Figure 3. The entrance of the ribs into the cuts serves to enable the star easily and quickly to be located in the desired assembled relation on a mirror, and it serves also to hold the star against movements from the properly aligned position.

It will be apparent from the foregoing that we have provided an improved fastening means for mirror assemblies. It will be evident further that we have provided elements for use in a construction of the type described by which the attractiveness of the mirror assembly is greatly improved and whereby the elements can be maintained in the properly aligned position throughout the useful life of the mirror.

The term "plastic part" or "hardware" as used herein and in the claims is often referred to in the trade as a "rosette."

It will be understood that changes may be made in the details of construction, arrangement, and operation without departing from the spirit of the invention, especially as defined in the following claims.

We claim:
1. Hardware for mounting a mirror on a soft backing board, said hardware comprising a bolt having a head at one end and a shank extending therefrom, said shank having a threaded end portion with a nut thereon at the opposite end of said bolt from said head, said shank having a substantially enlarged generally cylindrical intermediate portion adjacent said threaded end portion and spaced from said head, and a locking collar disposed on said shank between said enlarged portion and said nut, said collar comprising a centrally apertured disc, a sleeve rigid with said disc and extending axially therefrom toward said enlarged portion of said shank, and prongs extending from the outer portion of said disc toward said head of said bolt, said sleeve being slidably received on said threaded end portion of said shank but having an inside diameter substantially less than the outside diameter of said enlarged portion, said nut being adapted to force said sleeve onto said enlarged portion with a press fit, said sleeve having an expanded end portion projecting outwardly therefrom, said enlarged portion of said shank having a roughened outer surface to grip the inside of said sleeve.

2. Hardware for mounting a mirror on a soft backing board, said hardware comprising a bolt having a head at one end and a shank extending therefrom, said shank having a threaded end portion with a nut thereon at the opposite end of said bolt from said head, said shank having a substantially enlarged generally cylindrical intermediate portion adjacent said threaded end portion and spaced from said head, and a locking collar disposed on said shank between said enlarged portion and said nut, said collar comprising a centrally apertured disc, a sleeve rigid with said disc and extending axially therefrom toward said enlarged portion of said shank, and prongs extending from the outer portion of said disc toward said head of said bolt, said sleeve being slidably received on said threaded end portion of said shank but having an inside diameter substantially less than the outside diameter of said enlarged portion, said nut being adapted to force said sleeve onto said enlarged portion with a press fit.

References Cited in the file of this patent

UNITED STATES PATENTS

| Number | Name | Date |
|---|---|---|
| 769,199 | Tower | Sept. 6, 1904 |
| 824,382 | Quitman | June 26, 1906 |
| 836,599 | McKee et al. | Nov. 20, 1906 |
| 1,061,176 | Hart | May 6, 1913 |
| 1,215,971 | Nolan | Feb. 13, 1917 |
| 1,432,243 | Harris | Oct. 17, 1922 |
| 1,632,236 | Kirk-Schneider | June 14, 1927 |
| 1,688,425 | La Hodny et al. | Oct. 23, 1928 |
| 1,971,396 | Waide | Aug. 28, 1934 |
| 2,275,315 | Ray | Mar. 3, 1942 |
| 2,476,561 | Pedersen | July 19, 1949 |
| 2,666,364 | Kelly | Jan. 19, 1954 |
| 2,678,585 | Ellis | May 18, 1954 |
| 2,713,482 | Stapleton | July 19, 1955 |
| 2,771,262 | Laystrom | Nov. 20, 1956 |